(12) United States Patent
Kinoshita

(10) Patent No.: US 10,377,246 B2
(45) Date of Patent: Aug. 13, 2019

(54) VEHICLE POWER SOURCE

(71) Applicant: SUBARU CORPORATION

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 438 days.

(21) Appl. No.: 15/358,314

(22) Filed: Nov. 22, 2016

(65) Prior Publication Data

US 2017/0151876 A1 Jun. 1, 2017

(30) Foreign Application Priority Data

Nov. 30, 2015 (JP) .................... 2015-233839

(51) Int. Cl.
*B60L 50/61* (2019.01)
*B60L 58/13* (2019.01)
(Continued)

(52) U.S. Cl.
CPC ............ *B60L 11/123* (2013.01); *B60L 7/10* (2013.01); *B60L 50/61* (2019.02); *B60L 58/13* (2019.02);
(Continued)

(58) Field of Classification Search
CPC ........ B60L 11/123; B60L 58/20; B60L 58/14; B60L 50/61; B60L 58/13; B60L 7/10;
(Continued)

(56) References Cited

U.S. PATENT DOCUMENTS

2002/0157882 A1* 10/2002 Kubo .................. B60K 6/28
                                                      180/65.26
2007/0182385 A1    8/2007 Ueda et al.
(Continued)

FOREIGN PATENT DOCUMENTS

| JP | 2007-203788 A | 8/2007 |
| JP | 2011-135727 A | 7/2011 |
| JP | 2014-036557 A | 2/2014 |

OTHER PUBLICATIONS

Office Action issued in corresponding Japanese Patent No. 2015-233839, dated Nov. 14, 2017.

*Primary Examiner* — Rexford N Barnie
*Assistant Examiner* — Terrence R Willoughby
(74) *Attorney, Agent, or Firm* — McDermott Will & Emery LLP

(57) ABSTRACT

A vehicle power source includes a generator, a power storage, a vehicle body equipment group, a current consumption estimating unit, a charge and discharge current setting unit, a generated current setting unit, and a generated current controller. The current consumption estimating unit estimates current consumption of the vehicle body equipment group, on a basis of a generated current of the generator and a charge and discharge current of the power storage. The charge and discharge current setting unit sets a target charge and discharge current of the power storage, on a basis of a state of charge of the power storage. The generated current setting unit sets a target generated current of the generator, on a basis of the current consumption and the target charge and discharge current. The generated current controller controls the generated current, on a basis of the target generated current.

14 Claims, 11 Drawing Sheets

(51) Int. Cl.
    *B60L 11/12*     (2006.01)
    *B60L 7/10*     (2006.01)
    *B60L 58/14*     (2019.01)
    *B60L 58/20*     (2019.01)

(52) U.S. Cl.
CPC ............... B60L 58/14 (2019.02); B60L 58/20 (2019.02); *B60L 2240/12* (2013.01); *B60L 2240/16* (2013.01); *B60L 2240/423* (2013.01); *B60Y 2200/92* (2013.01); *Y02T 10/6217* (2013.01); *Y02T 10/642* (2013.01); *Y02T 10/7011* (2013.01); *Y02T 10/7044* (2013.01); *Y02T 10/7066* (2013.01); *Y02T 10/7077* (2013.01); *Y10S 903/906* (2013.01); *Y10S 903/907* (2013.01)

(58) Field of Classification Search
CPC ........... B60L 2240/12; B60L 2240/423; B60L 2240/16; Y02T 10/7011; Y02T 10/7066; Y02T 10/7044; Y02T 10/642; Y02T 10/7077; Y02T 10/6217; Y10S 903/907; Y10S 903/906; B60Y 2200/92
See application file for complete search history.

(56) References Cited

U.S. PATENT DOCUMENTS

| | | | |
|---|---|---|---|
| 2011/0127958 A1* | 6/2011 | Ishishita | B60W 20/13 320/109 |
| 2013/0096764 A1* | 4/2013 | Yamamoto | B60K 6/445 701/22 |
| 2013/0119756 A1* | 5/2013 | Hayashi | B60L 58/20 307/9.1 |
| 2015/0362557 A1* | 12/2015 | Takashima | G01R 31/44 324/426 |

* cited by examiner

VEHICLE POWER SOURCE

CROSS-REFERENCE TO RELATED APPLICATIONS

The present application claims priority from Japanese Patent Application No. 2015-233839 filed on Nov. 30, 2015, the entire contents of which are hereby incorporated by reference.

BACKGROUND

The technology relates to a vehicle power source that may be mounted on a vehicle.

As a vehicle power source that may be mounted on a vehicle, a power source have been proposed that includes a power storage such as, but not limited to, a lithium ion battery and a capacitor (refer to Japanese Unexamined Patent Application Publication (JP-A) No. 2014-36557). Adoption of the power storage having low internal resistance, e.g., the lithium ion battery, makes it possible to efficiently recover regenerative electric power in vehicle deceleration. The power source may be also provided with a generator that may be driven by an engine. In many cases, a generated voltage of the generator may be controlled in accordance with a power consumption state of the vehicle.

SUMMARY

In the vehicle equipped with the vehicle power source, it is desirable to stably perform a charge and discharge control of the power storage and an engine control. This leads to growing expectation of more stable control of the power storage and the engine.

It is desirable to provide a vehicle power source that makes it possible to stably control a power storage and an engine.

An aspect of the technology provides a vehicle power source mounted on a vehicle, the vehicle power source including a generator, a power storage, a vehicle body equipment group, a current consumption estimating unit, a charge and discharge current setting unit, a generated current setting unit, and a generated current controller. The generator is coupled to an engine. The power storage is coupled to the generator. The vehicle body equipment group is coupled, in parallel with the power storage, to the generator. The current consumption estimating unit estimates current consumption of the vehicle body equipment group, on a basis of a generated current of the generator and a charge and discharge current of the power storage. The charge and discharge current setting unit sets a target charge and discharge current of the power storage, on a basis of a state of charge of the power storage. The generated current setting unit sets a target generated current of the generator, on a basis of the current consumption of the vehicle body equipment group and the target charge and discharge current of the power storage. The generated current controller controls the generated current of the generator, on a basis of the target generated current of the generator.

DETAILED DESCRIPTION

Figure 1:
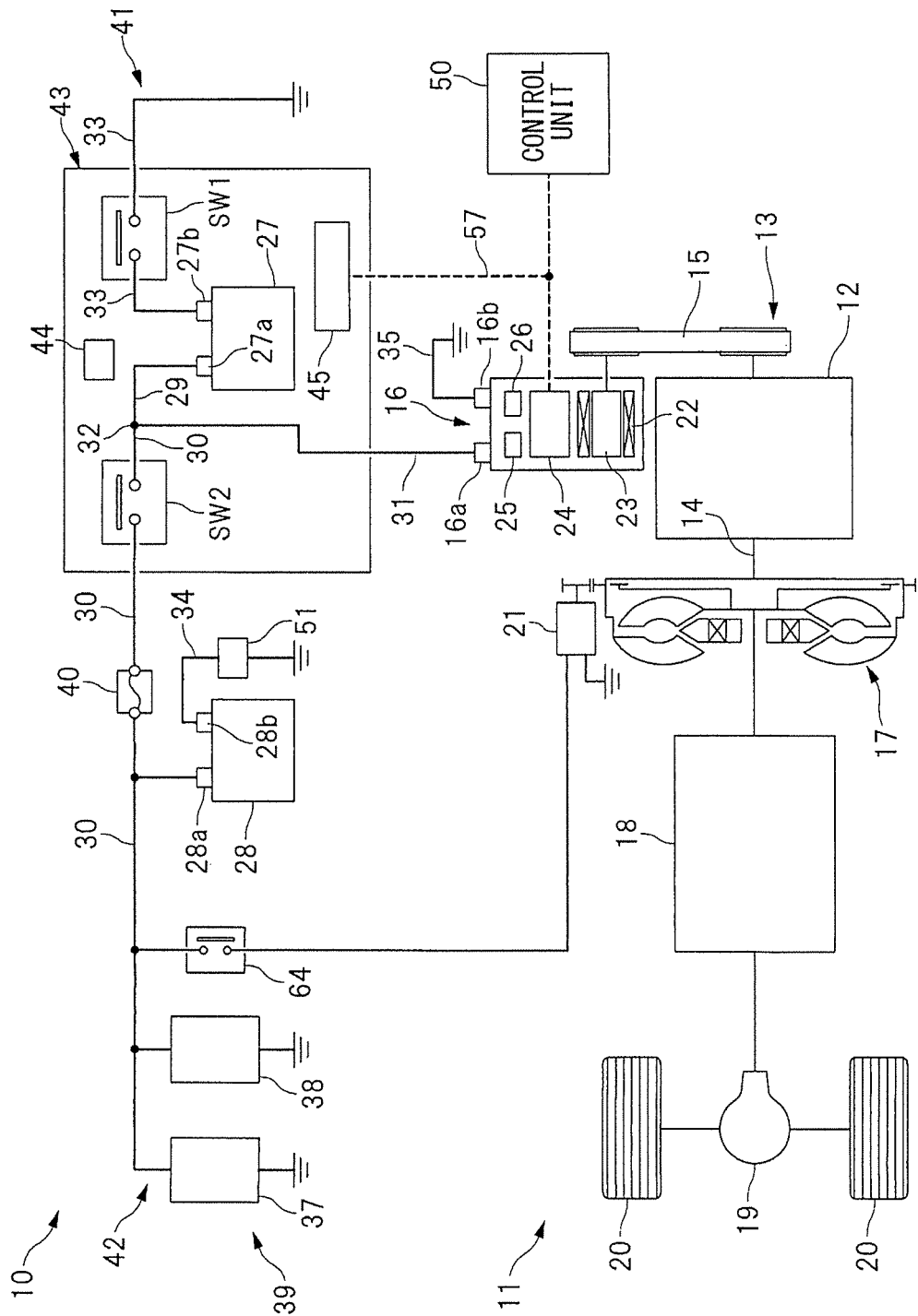
FIG. 1 schematically illustrates a configuration example of a vehicle including a vehicle power source according to an implementation of the technology.

In the following, some implementations of the technology are described in detail with reference to the drawings. FIG. 1 schematically illustrates a configuration example of a vehicle 11 including a vehicle power source 10 according to an implementation of the technology. Referring to FIG. 1, the vehicle 11 may include a power unit 13 having an engine 12. The engine 12 may include a crank shaft 14 to which a motor generator 16 may be coupled through a belt mechanism 15. Thus, the motor generator 16 is mechanically coupled to the engine 12. In one implementation of the technology, the motor generator 16 may serve as a "generator". A transmission mechanism 18 may be also coupled to the engine 12 through a torque converter 17. One or more wheels 20 may be coupled to the transmission mechanism 18 through a differential mechanism 19 or other parts. The power unit 13 may further include a starter motor 21 that causes starting revolution of the crank shaft 14.

The motor generator 16 may be a so-called integrated starter generator (ISG). Not only may the motor generator 16 serve as a generator that is driven by the crank shaft 14 to generate power, the motor generator 16 may also serve as an electric motor that causes the starting revolution of the crank shaft 14. The motor generator 16 may include a stator 22 and a rotor 23; the stator 22 may include a stator coil, and the rotor 23 may include a field coil. The motor generator 16 may further include an ISG controller 24, in order to control energized states of the stator coil and the field coil. The ISG controller 24 may include an inverter, a regulator, a microcomputer, and other parts. The motor generator 16 may further include a voltage sensor 25 and a current sensor 26. The voltage sensor 25 may detect a generated voltage. The current sensor 26 may detect a generated current. Allowing the ISG controller 24 to control the energized states of the field coil and the stator coil makes it possible to control the generated voltage and the generated current of the motor generator 16 that may serve as the generator. Also, allowing the ISG controller 24 to control the energized states of the field coil and the stator coil makes it possible to control driving torque and the number of revolutions of the motor generator 16 that may serve as the electric motor.

Figure 2:
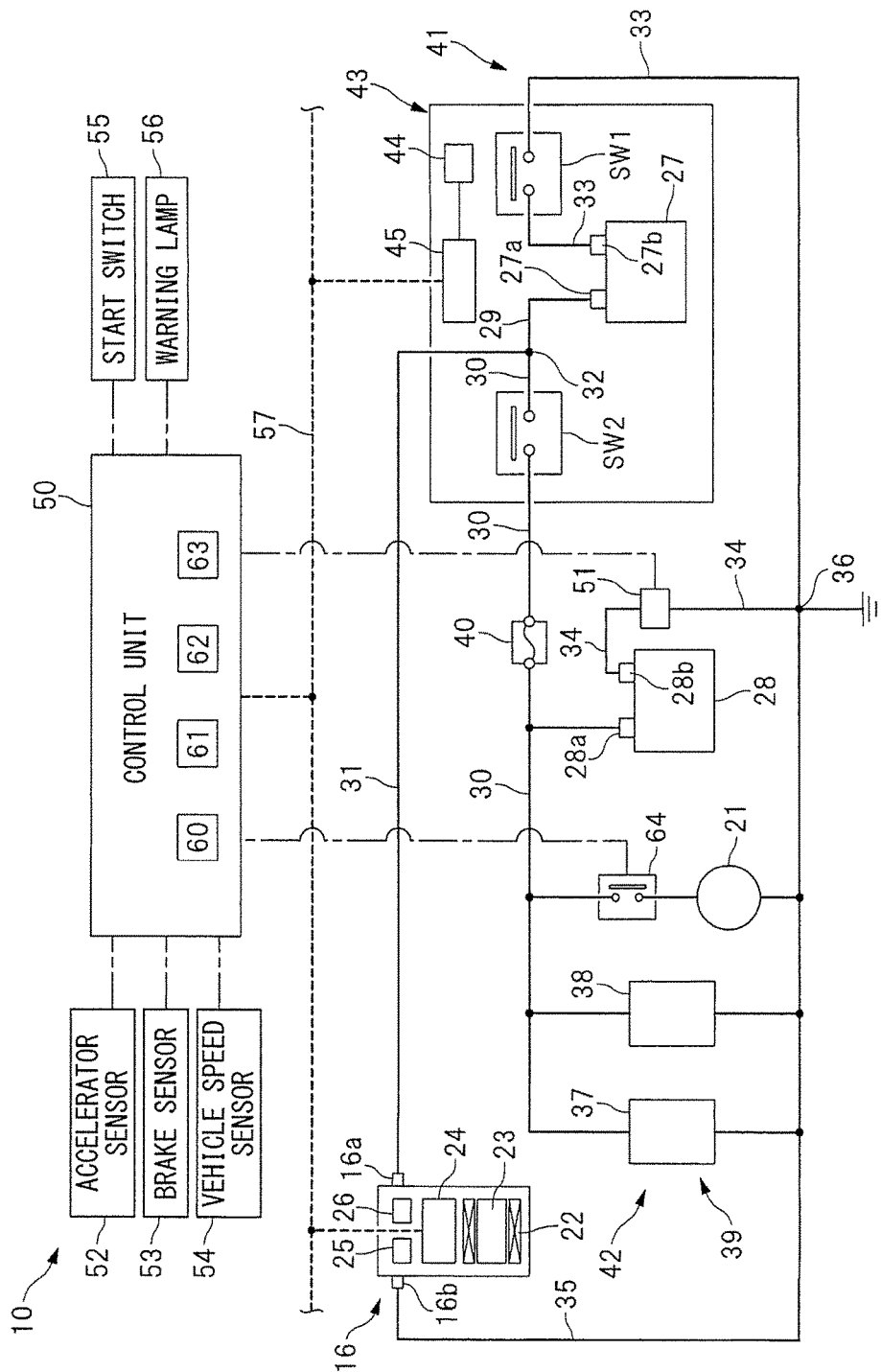
FIG. 2 is a block diagram of a configuration example of the vehicle power source.
Figure 3:
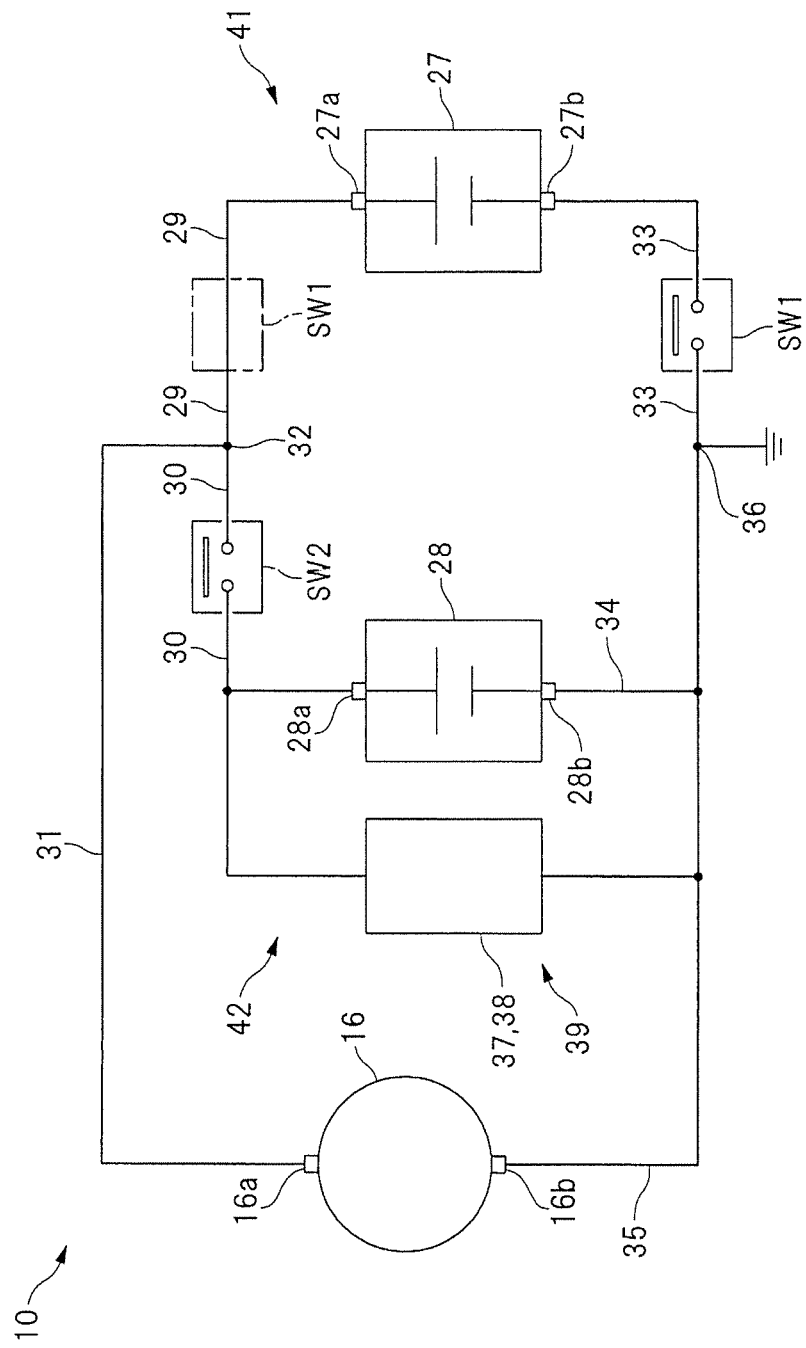
FIG. 3 is a simplified circuit diagram of a configuration of the vehicle power source.

Description is given next in detail of a configuration of the vehicle power source 10. FIG. 2 is a block diagram of a configuration example of the vehicle power source 10. FIG. 3 is a simplified circuit diagram of a configuration of the vehicle power source 10. Referring to FIGS. 1 to 3, the vehicle power source 10 may include a lithium ion battery 27 and a lead battery 28. The lead battery 28 may be coupled in parallel to the lithium ion battery 27. In one implementation of the technology, the lithium ion battery 27 may serve as a "first power storage" or a "power storage", and the lead battery 28 may serve as a "second power storage". The lithium ion battery 27 is coupled to the motor generator 16. The lead battery 28 may be coupled, in parallel with the lithium ion battery 27, to the motor generator 16.

A positive electrode line 29 may be coupled to a positive electrode terminal 27a of the lithium ion battery 27. A positive electrode line 30 may be coupled to a positive electrode terminal 28a of the lead battery 28. Moreover, the motor generator 16 may include a positive electrode terminal 16a that supplies the generated current of the motor generator 16. A positive electrode line 31 may be coupled to the positive electrode terminal 16a. The positive electrode lines 29 to 31 may be coupled to one another through a connection point 32. Furthermore, a negative electrode line 33 may be coupled to a negative electrode terminal 27b of the lithium ion battery 27. A negative electrode line 34 may be coupled to a negative electrode terminal 28b of the lead battery 28. A negative electrode line 35 may be coupled to a negative electrode terminal 16b of the motor generator 16. The negative electrode lines 33 to 35 may be coupled to a reference potential point 36.

The negative electrode line 33 coupled to the lithium ion battery 27 may be provided with an ON/OFF switch SW1. The positive electrode line 30 coupled to the lead battery 28 may be provided with an ON/OFF switch SW2. The ON/OFF switches SW1 and SW2 each may operate in a closed state or a conductive state (i.e., an ON state) and in an open state or a cut-off state (i.e., an OFF state). In other words, the ON/OFF switch SW1 may be switched between the conductive state and the cut-off state; the conductive state may involve electrical coupling of the motor generator 16 to the lithium ion battery 27, and the cut-off state may involve electrical separation of the motor generator 16 from the lithium ion battery 27. Similarly, the ON/OFF switch SW2 may be switched between the conductive state and the cut-off state; the conductive state may involve electrical coupling of the motor generator 16 to the lead battery 28, and the cut-off state may involve electrical separation of the motor generator 16 from the lead battery 28. Note that, in the illustrated example, the ON/OFF switch SW1 may be inserted in the negative electrode line 33 coupled to the lithium ion battery 27, but this is non-limiting. In one example, as indicated by an alternate long and short dash line in FIG. 3, the ON/OFF switch SW1 may be inserted in the positive electrode line 29 coupled to the lithium ion battery 27.

To the positive electrode line 30, equipment such as, but not limited to, an instantaneous voltage drop protection load 37, a vehicle body load 38, and the starter motor 21 may be coupled. In other words, the vehicle power source 10 includes a vehicle body equipment group 39. The vehicle body equipment group 39 may include, for example, the instantaneous voltage drop protection load 37, the vehicle body load 38, the starter motor 21, and the lead battery 28. The vehicle body equipment group 39 may include various loads supplied with currents from the motor generator 16 or the lithium ion battery 27. The vehicle body equipment group 39 may be coupled, in parallel with the lithium ion battery 27, to the motor generator 16. Also, the positive electrode line 30 may be provided with a fuse 40. The fuse 40 may protect the equipment such as the instantaneous voltage drop protection load 37, the vehicle body load 38, and the starter motor 21.

Note that the instantaneous voltage drop protection load 37 may be electrical equipment that ought to be kept in operation during engine restart in an idling stop control. Non-limiting examples of the instantaneous voltage drop protection load 37 may include auxiliaries of the engine 12, a brake actuator, a power steering actuator, an instrumental panel, and various controllers. Also, the vehicle body load 38 may be electrical equipment whose instantaneous shutdown is allowable during the engine restart in the idling stop control. Non-limiting examples of the vehicle body load 38 may include a door mirror motor, a power window motor, and a radiator fan motor.

As illustrated in FIGS. 1 and 2, the vehicle power source 10 may include a first power circuit 41 that includes the lithium ion battery 27 and the motor generator 16. The vehicle power source 10 may also include a second power circuit 42 that includes components such as, but not limited to, the lead battery 28, the instantaneous voltage drop protection load 37, the vehicle body load 38, and the starter motor 21. The first power circuit 41 and the second power circuit 42 may be coupled to each other through the ON/OFF switch SW2. Note that the ON/OFF switch SW1 provided in the first power circuit 41 may serve as a switch that electrically separates the lithium ion battery 27 from the vehicle power source 10. Furthermore, the vehicle power source 10 may include a battery module 43. In the battery module 43, the lithium ion battery 27 and the ON/OFF switches SW1 and SW2 may be incorporated.

The battery module 43 may include a battery sensor 44 that detects a current, a voltage, temperature, and other characteristics of the lithium ion battery 27. Moreover, the battery module 43 may include a battery controller 45, in order to control operation states of the ON/OFF switches SW1 and SW2. The battery controller 45 may include, for example, a drive circuit and a microcomputer. The battery controller 45 may control the ON/OFF switches SW1 and SW2, on the basis of control signals from a control unit 50, as described later. Also, the battery controller 45 may open the ON/OFF switch SW1 to separate the lithium ion battery 27 from the vehicle power source 10, when an excessive charge and discharge current or an increase in temperature of the lithium ion battery 27 is detected.

As illustrated in FIG. 2, the vehicle power source 10 includes a control unit 50 that controls the motor generator 16, the battery module 43, and other parts. The control unit 50 may have a function of controlling charge and discharge of the lithium ion battery 27, by controlling the generated voltage and other characteristics of the motor generator 16. The control unit 50 may determine a state of charge of the lithium ion battery 27 and operation states of an accelerator pedal and a brake pedal, on the basis of input signals from other controllers and sensors. As described later, the control unit 50 may control the generated voltage and the generated current of the motor generator 16, on the basis of characteristics such as the state of charge of the lithium ion battery 27 and current consumption of the vehicle body equipment group 39, and control the charge and discharge of the lithium ion battery 27.

The control unit 50 may also have a function of controlling stop and restart of the engine 12. The control unit 50 may determine a stop condition and a start condition of the engine 12, on the basis of input signals from other controllers and sensors. The control unit 50 may automatically stop the engine 12 when the stop condition is established, and automatically restart the engine 12 when the start condition is established. A non-limiting example of the stop condition of the engine 12 may be that a vehicle speed is equal to or lower than a predetermined vehicle speed and the brake pedal is stepped down. Non-limiting examples of the start condition of the engine 12 may include that stepping down of the brake pedal is released, and that the accelerator pedal is stepped down.

The control unit 50 may be coupled to sensors such as, but not limited to, a battery sensor 51, an accelerator sensor 52, and a brake sensor 53. The battery sensor 51 may detect a charge and discharge current, a state of charge, and other characteristics of the lead battery 28. The accelerator sensor 52 may detect an amount of stepping down of the accelerator pedal. The brake sensor 53 may detect an amount of stepping down of the brake pedal. The control unit 50 may be also coupled to other sensors such as, but not limited to, a vehicle speed sensor 54 and a start switch 55. The vehicle speed sensor 54 may detect a vehicle speed, i.e. a traveling speed of the vehicle 11. The start switch 55 may be manually operated in engine start. The control unit 50 may receive, from the ISG controller 24, the generated voltage, the generated current, power generation torque, the drive torque, and other characteristics of the motor generator 16. Similarly, the control unit 50 may receive, from the battery controller 45, characteristics such as the charge and discharge current, and the state of charge of the lithium ion battery 27, and the operation states of the ON/OFF switches SW1 and SW2. Furthermore, a warning lamp 56 may be coupled to the control unit 50. The warning lamp 56 may inform an occupant of abnormality of the vehicle power source 10.

Note that the control unit 50 may include, for example, a microcomputer and a drive circuit. The microcomputer may include a CPU, ROM, RAM, and other components. The drive circuit may generate control currents of various actuators. The control unit 50, the motor generator 16, the battery module 43, and other parts may be coupled to one another through an on-vehicle network 57 such as, but not limited to, CAN and LIN.

[Voltage Characteristics of Batteries]

Figure 4:
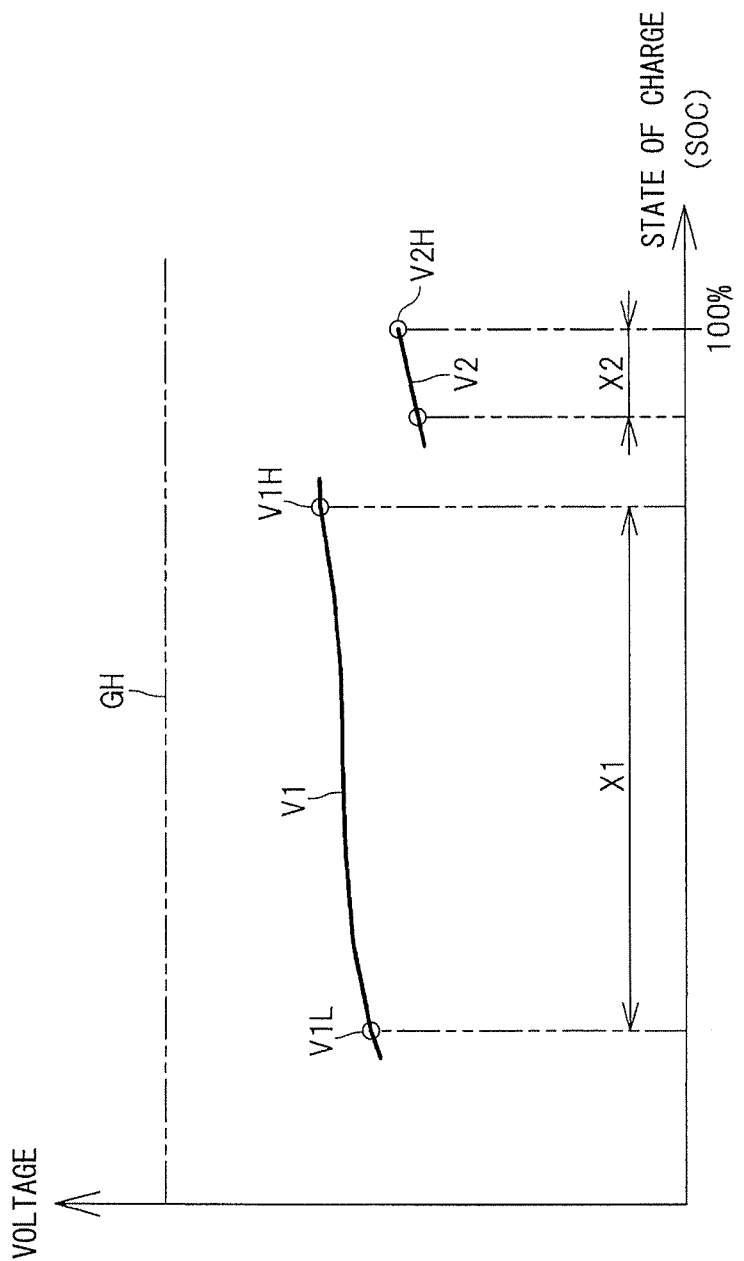
FIG. 4 is a diagram of relations between terminal voltages and states of charge in batteries.

Description is given next of voltage characteristics of the lithium ion battery 27 and the lead battery 28. FIG. 4 is a diagram of relations between terminal voltages and the states of charge SOC in the batteries. Note that a state of charge SOC is a value that indicates a degree of charge of a battery, or a ratio of a charged amount to design capacity of a battery. In FIG. 4, terminal voltages V1 and V2 indicate battery voltages with no current flowing therethrough, i.e., an open end voltage. Also, in FIG. 4, a reference character GH indicates a maximum generated voltage of the motor generator 16.

Referring to FIG. 4, the terminal voltage V1 of the lithium ion battery 27 may be set higher than the terminal voltage V2 of the lead battery 28. In other words, a lower limit voltage V1L of a charge and discharge range X1 of the lithium ion battery 27 may be set higher than an upper limit voltage V2H of a charge and discharge range X2 of the lead battery 28. Moreover, the terminal voltage V1 of the lithium ion battery 27 may be set lower than an upper limit (e.g., 16 V) of a charge voltage of the lead battery 28. In other words, an upper limit voltage V1H of the charge and discharge range X1 of the lithium ion battery 27 may be set lower than the upper limit of the charge voltage of the lead battery 28. This makes it possible to avoid excessive charge of the lead battery 28 by the lithium ion battery 27 even in a case of parallel connection of the lithium ion battery 27 and the lead battery 28, and to avoid deterioration of the lead battery 28. Note that an upper limit of a charge voltage is an upper limit value of a charge voltage, specified for each type of power storage in view of suppression of deterioration of a power storage.

As illustrated in FIG. 4, the lithium ion battery 27 may be provided with the broad charge and discharge range X1, owing to optimal cycle characteristics of the lithium ion battery 27. In contrast, the lead battery 28 may be provided with the narrow charge and discharge range X2 near full charge, in view of prevention of battery deterioration. Moreover, internal resistance of the lithium ion battery 27 may be set lower than internal resistance of the lead battery 28.

[Charge and Discharge Control of Lithium Ion Battery]

Figure 5:
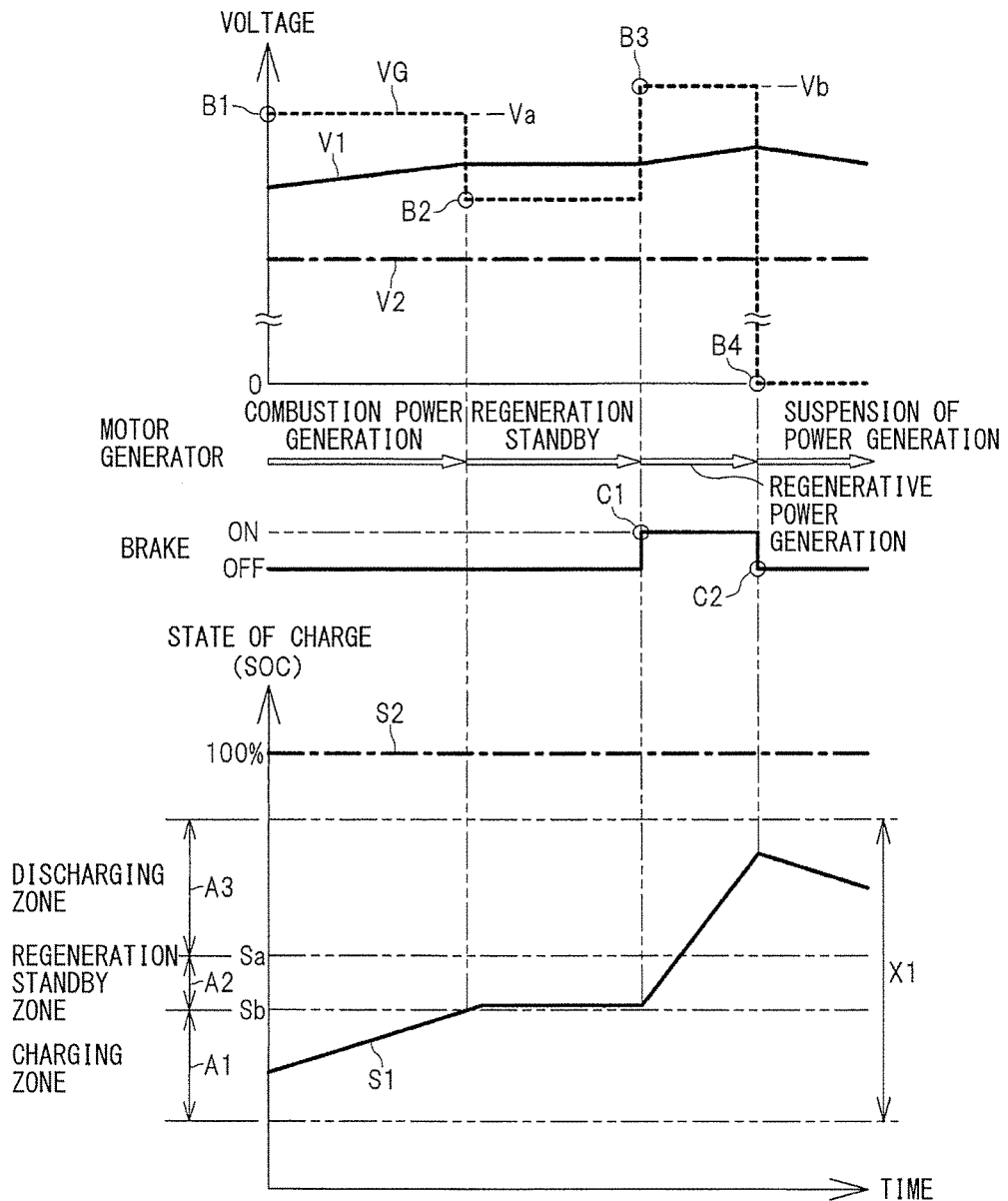
FIG. 5 is a timing chart of transition of control states in a motor generator and of states of charge in a lithium ion battery.
Figure 6:
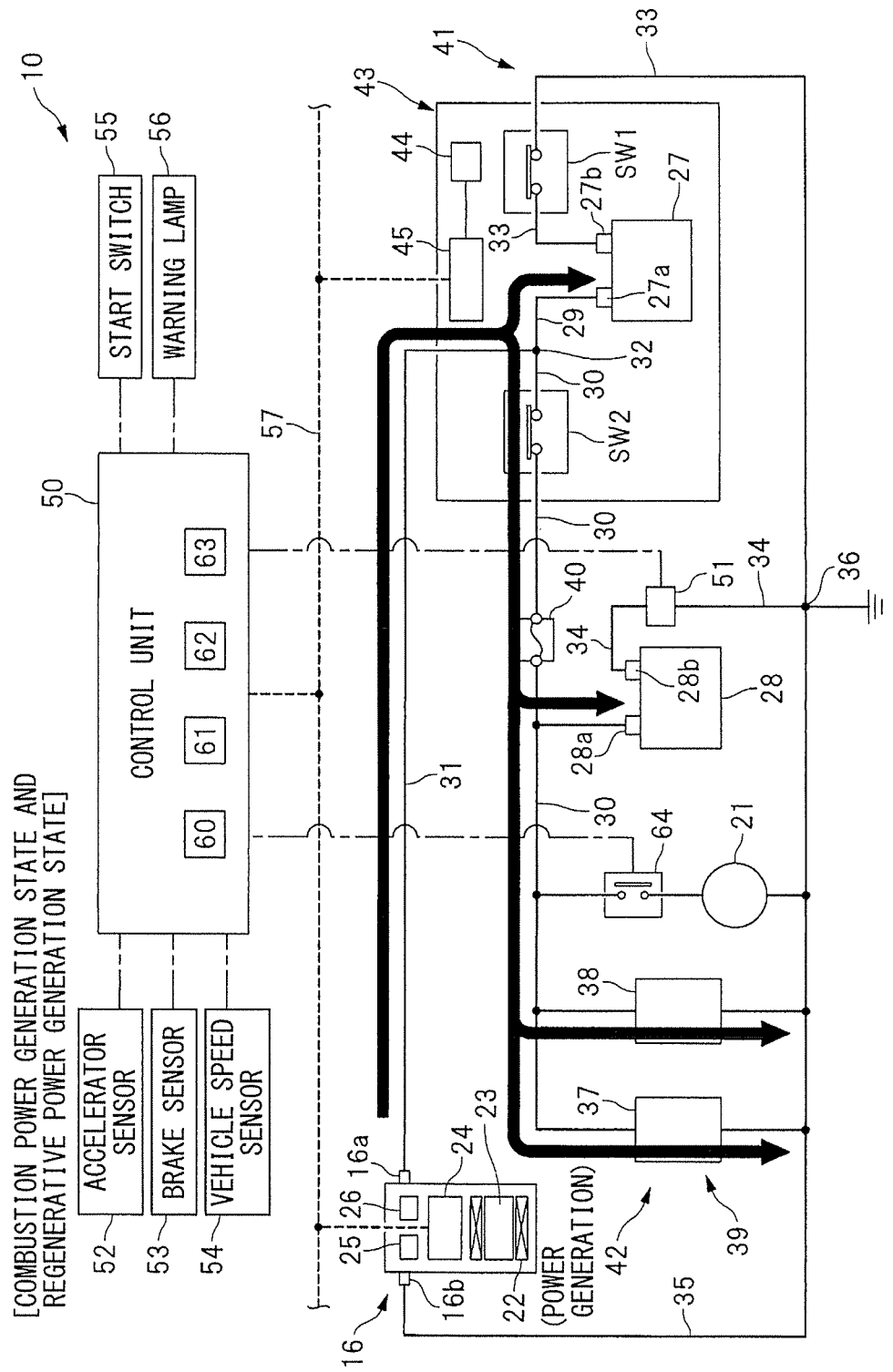
FIG. 6 illustrates a state of power supply of the vehicle power source.
Figure 7:
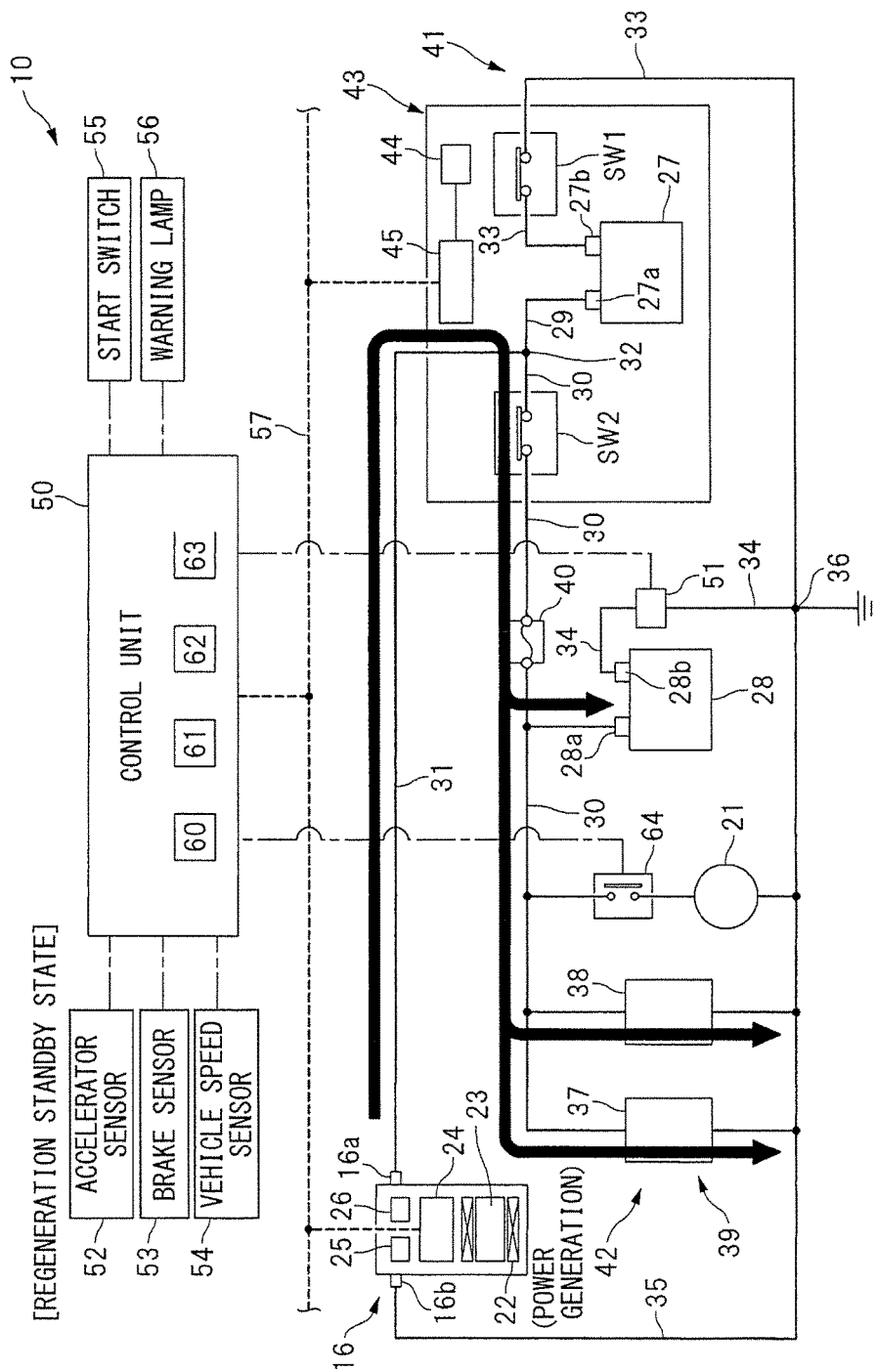
FIG. 7 illustrates a state of power supply of the vehicle power source.
Figure 8:
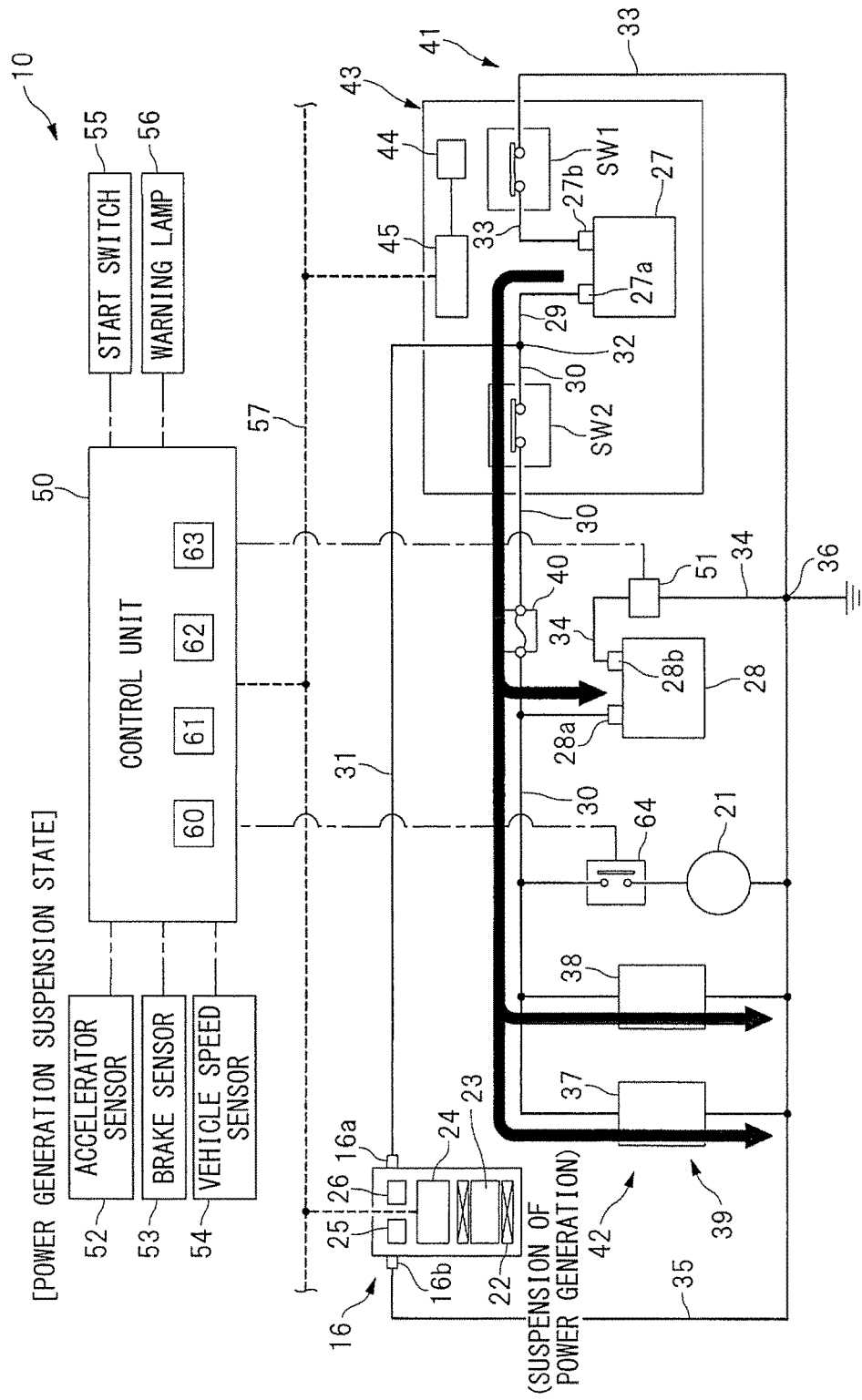
FIG. 8 illustrates a state of power supply of the vehicle power source.

Description is given next of the charge and discharge control of the lithium ion battery 27 with use of the motor generator 16. FIG. 5 is a timing chart of transition of control states of the motor generator 16 and of the states of charge S1 of the lithium ion battery 27. FIGS. 6 to 8 illustrate states of power supply of the vehicle power source 10. FIG. 6 illustrates a state in which the motor generator 16 is controlled to a combustion power generation state or a regenerative power generation state. FIG. 7 illustrates a state in which the motor generator 16 is controlled to a regeneration standby state. FIG. 8 illustrates a state in which the motor generator 16 is controlled to a power generation suspension state.

First, described is a case in which, as denoted by a reference character A1 in FIG. 5, the state of charge S1 of the lithium ion battery 27 is lower than a threshold Sb, i.e., a case in which the state of charge S1 falls in a charging zone. The threshold Sb may be, for example, 30% without limitation. In one implementation of the technology, the threshold Sb may serve as a "second threshold". When the state of charge S1 falls in the charging zone, the motor generator 16 may be controlled to the combustion power generation state, in order to charge the lithium ion battery 27. Note that the combustion power generation state of the motor generator 16 may involve allowing the motor generator 16 to generate power with engine power, and converting thermal energy of fuel supplied to the engine 12 to electric energy. In controlling the motor generator 16 to the combustion power generation state, the generated voltage VG of the motor generator 16 may be controlled to a predetermined voltage Va (a reference character B1) that is higher than the terminal voltage V1 of the lithium ion battery 27. This allows the generated current of the motor generator 16 to be supplied to the lithium ion battery 27 and the vehicle body equipment group 39, as denoted by a solid black arrow in FIG. 6. Note that the ON/OFF switches SW1 and SW2 may be kept in the closed state, in controlling the motor generator 16 to the combustion power generation state.

Now described is a case in which, as denoted by a reference character A2 in FIG. 5, the state of charge S1 of the lithium ion battery 27 is higher than the threshold Sb and is lower than a threshold Sa, i.e., a case in which the state of charge S1 falls in a regeneration standby zone. The threshold Sa may be, for example, 40% without limitation. In one implementation of the technology, the threshold Sa may serve as a "first threshold". When the state of charge S1 falls in the regeneration standby zone, the motor generator 16 may be controlled to the regeneration standby state, in order to wait for an opportunity of regenerative power generation while suppressing the generated current of the motor generator 16. In controlling the motor generator 16 to the regeneration standby state, the generated voltage VG of the motor generator 16 may be controlled to a predetermined voltage (the reference character B2) that is lower than the terminal voltage V1 of the lithium ion battery 27 and higher than the terminal voltage V2 of the lead battery 28. This allows the generated current of the motor generator 16 to be supplied to the vehicle body equipment group 39, as denoted by a solid black arrow in FIG. 7, to cover current consumption of the vehicle body equipment group 39. Moreover, in the regeneration standby state of the motor generator 16, the charge and discharge current of the lithium ion battery 27 may be controlled to substantially "zero (0)". Note that the ON/OFF switches SW1 and SW2 may be kept in the closed state, in controlling the motor generator 16 to the regeneration standby state.

Described next is a case in which, as denoted by a reference character A3 in FIG. 5, the state of charge S1 of the lithium ion battery 27 is higher than the threshold Sa, i.e., a case in which the state of charge S1 falls in a discharging zone. When the state of charge S1 falls in the discharging zone, the motor generator 16 may be controlled to a power generation suspension state, in order to positively allow the lithium ion battery 27 to discharge electric power stored therein. In other words, operation of power generation of the motor generator 16 may be suspended by a generated current controller 63 of the control unit 50, as described later. In controlling the motor generator 16 to the power generation suspension state, the generated voltage VG of the motor generator 16 may be controlled to "zero (0)" (a reference character B4) that is lower than the terminal voltage V1 of the lithium ion battery 27. This allows the discharge current of the lithium ion battery 27 to be supplied to the vehicle body equipment group 39, as denoted by a solid black arrow in FIG. 8, to cover the current consumption of the vehicle body equipment group 39. Note that the ON/OFF switches SW1 and SW2 may be kept in the closed state, in controlling the motor generator 16 to the power generation suspension state.

As described above, the motor generator 16 may be controlled to the combustion power generation state, the regeneration standby state, or the power generation suspension state, on the basis of the state of charge S1 of the lithium ion battery 27. Meanwhile, in vehicle deceleration, the motor generator 16 may be controlled to the regenerative power generation state, in terms of improved energy efficiency of the vehicle 11 and higher fuel consumption performance. Note that the regenerative power generation state of the motor generator 16 may involve allowing the motor generator 16 to generate power in the vehicle deceleration, to convert kinetic energy of the vehicle 11 to electric energy. Whether to execute regenerative power generation of the motor generator 16 or not may be determined on the basis of conditions such as, but not limited to, the operation states of the accelerator pedal and the brake pedal. For example, the motor generator 16 may be controlled to the regenerative power generation state in the vehicle deceleration in which the stepping down of the accelerator pedal is released, or in the vehicle deceleration in which the brake pedal is stepped down. In contrast, the regenerative power generation state of the motor generator 16 may be cancelled when the accelerator pedal is stepped down, or when the stepping down of the brake pedal is released. Note that, when the regenerative power generation state of the motor generator 16 is cancelled, the motor generator 16 may be controlled to the combustion power generation state, the regeneration standby state, or the power generation suspension state, on the basis of the state of charge S1 at the time of the cancellation.

For example, when the brake pedal is stepped down, as denoted by a reference character C1 in FIG. 5, the motor generator 16 may be controlled to the regenerative power generation state. In controlling the motor generator 16 to the regenerative power generation state, the generated voltage VG of the motor generator 16 may be controlled to the predetermined voltage Vb (a reference character B3) that is higher than the terminal voltage V1 of the lithium ion battery 27. This allows the generated current of the motor generator 16 to be supplied to the lithium ion battery 27 and the vehicle body equipment group 39, as denoted by the solid black arrow in FIG. 6. Note that the ON/OFF switches SW1 and SW2 may be kept in the closed state, in controlling the motor generator 16 to the regenerative power generation state.

As described so far, controlling the generated voltage VG of the motor generator 16 makes it possible to control the charge and discharge of the lithium ion battery 27. In one specific but non-limiting implementation, raising the generated voltage VG above the terminal voltage V1 allows the lithium ion battery 27 to be charged, whereas lowering the generated voltage VG below the terminal voltage V1 allows the lithium ion battery 27 to discharge. Moreover, the terminal voltage V1 of the lithium ion battery 27 may be set higher than the terminal voltage V2 of the lead battery 28. This allows for the charge and discharge of the lithium ion battery 27, with the ON/OFF switches SW1 and SW2 kept in the closed state. In other words, it is possible to allow the lithium ion battery 27 to discharge, without separating the lead battery 28 from the lithium ion battery 27. This makes it possible to positively allow the lithium ion battery 27 to be charged or to discharge, without complicating a circuit structure or a switch control of the vehicle power source 10. Hence, it is possible to enhance the energy efficiency of the vehicle 11 and to reduce costs of the vehicle power source 10.

As illustrated in FIG. 6, in allowing the motor generator 16 to generate power, it is possible to positively charge the lithium ion battery 27, while suppressing charge of the lead battery 28. Specifically, because the internal resistance of the lithium ion battery 27 is lower than the internal resistance of the lead battery 28, it is possible to positively charge the lithium ion battery 27. Moreover, as illustrated in FIG. 8, in suspending the power generation of the motor generator 16, it is possible to positively allow the lithium ion battery 27 to discharge, while suppressing discharge of the lead battery 28. Specifically, because the terminal voltage V1 of the lithium ion battery 27 is higher than the terminal voltage V2 of the lead battery 28, it is possible to positively allow the lithium ion battery 27 to discharge. Such suppression of the charge and discharge of the lead battery 28 makes it possible to relieve requests for output characteristics and cycle characteristics of the lead battery 28, leading to reduction in costs of the lead battery 28. From this viewpoint as well, it is possible to reduce costs of the vehicle power source 10.

[Generated Current Control of Motor Generator]

As described above, in the vehicle power source 10, the generated voltage of the motor generator 16 may be controlled to control the charge and discharge of the lithium ion battery 27. Because of the low internal resistance of the lithium ion battery 27, however, there is possibility that an excessive current may flow into the lithium ion battery 27 from the motor generator 16 depending on conditions such as, but not limited to, the state of charge of the lithium ion battery 27. The vehicle power source 10 may therefore control the generated current of the motor generator 16, on the basis of a target generated current Iisgt, in order to keep the generated current of the motor generator 16 from excessively increasing. In the following, description is given on a generated current control of the motor generator 16.

As illustrated in FIG. 2, the control unit 50 may include a current consumption estimating unit 60, a charge and discharge current setting unit 61, a generated current setting unit 62, and a generated current controller 63. As given by the following Expression (1), the current consumption estimating unit 60 of the control unit 50 may subtract a charge and discharge current Ilib of the lithium ion battery 27 and a charge and discharge current Ipb of the lead battery 28 from the generated current Iisg of the motor generator 16, to calculate a vehicle body current Ivl that may be supplied to the equipment such as, but not limited to, the instantaneous voltage drop protection load 37 and the vehicle body load 38.

$$Ivl = Iisg - Ilib - Ipb \quad (1)$$

Note that, in this specification, the charge and discharge current Ilib is a positive value, when the charge and discharge current Ilib is the charge current. The charge and discharge current Ilib is a negative value, when the charge and discharge current Ilib is the discharge current. Similarly, the charge and discharge current Ipb is a positive value, when the charge and discharge current Ipb is the charge current. The charge and discharge current Ipb is a negative value, when the charge and discharge current Ipb is the discharge current.

Figure 9:
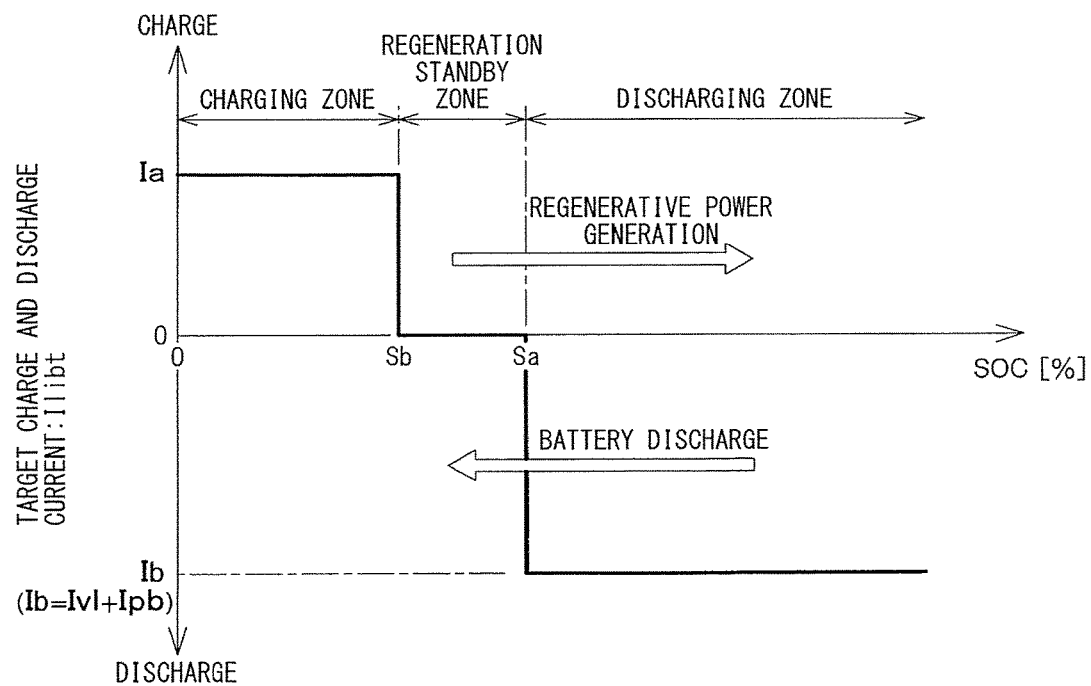
FIG. 9 illustrates an example of a setting state of a target charge and discharge current.

Thereafter, the charge and discharge current setting unit 61 of the control unit 50 may set the target charge and discharge current Ilibt, on the basis of the state of charge S1 of the lithium ion battery 27. The target charge and discharge current Ilibt may be a target value of the charge and discharge current of the lithium ion battery 27. FIG. 9 illustrates one example of a setting state of the target charge and discharge current Ilibt. Referring to FIG. 9, in a case in which the state of charge SI of the lithium ion battery 27 is lower than the threshold Sb, i.e., in a case in which the state of charge S1 falls in the charging zone, the target charge and discharge current Ilibt may be set to a charge current value Ia. The threshold Sb may be, for example, 30% without limitation. The charge current value Ia may be, for example, 20 A without limitation. Thus, in the case in which the state of charge S1 is lower than the threshold Sb, the target charge and discharge current Ilibt may be set to the charge current value Ia, to allow the target charge and discharge current Ilibt to be set on charge side. In one implementation of the technology, the threshold Sb may serve as the "second threshold", and the charge current value Ia may serve as a "first current value".

In a case in which the state of charge S1 of the lithium ion battery 27 is higher than the threshold Sb and lower than the threshold Sa, i.e., in a case in which the state of charge S1 falls in the regeneration standby zone, the target charge and discharge current Ilibt may be set to "zero (0)". The threshold Sa may be, for example, 40% without limitation. Thus, in the case in which the state of charge S1 is lower than the threshold Sa and higher than the threshold Sb, the target charge and discharge current Ilibt may be set to "zero (0)". In one implementation of the technology, "zero (0)" may serve as a "second current value". Note that the "second current value" to which the target charge and discharge current Ilibt may be set in the regeneration standby zone is not limited to "zero". Instead, the "second current value" may be set to any charge current value or any discharge current value as long as an absolute value thereof is smaller than an absolute value of the charge current value Ia that may serve as the "first current value" in one implementation of the technology.

Furthermore, in a case in which the state of charge S1 of the lithium ion battery 27 is higher than the threshold Sa, i.e., a case in which the state of charge S1 falls in the discharging zone, the target charge and discharge current Ilibt may be set to a discharge current value Ib. The discharge current value Ib may be an addition (Ib=Ivl+Ipb) of the vehicle body current Ivl and the charge and discharge current Ipb of the lead battery 28, i.e., the current consumption of the vehicle body equipment group 39. The vehicle body current Ivl may be supplied to the equipments such as, but not limited to, the vehicle body load 38. Thus, in the case in which the state of charge S1 is higher than the threshold Sa, the target charge and discharge current Ilibt may be set to the discharge current value Ib, to allow the target charge and discharge current Ilibt to be set on discharge side.

Thereafter, as given by the following Expression (2), the generated current setting unit 62 of the control unit 50 may add the vehicle body current Ivl, the charge and discharge current Ipb of the lead battery 28, and the target charge and discharge current Ilibt of the lithium ion battery 27, to calculate the target generated current Iisgt of the motor generator 16.

$$Iisgt = Ivl + Ipb + Ilibt \quad (2)$$

Then, the generated current setting unit 62 of the control unit 50 may supply a control signal to the ISG controller 24, to allow the generated current of the motor generator 16 to converge at the target generated current Iisgt. Note that the generated current of the motor generator 16 may be limited by the target generated current Iisgt even in a situation that other factors cause an increase in the generated current of the motor generator 16. In other words, the target generated current Iisgt may function as an upper limit of the generated current of the motor generator 16.

As described so far, in setting the target generated current Iisgt of the motor generator 16, the target charge and discharge current Ilibt may be added to the vehicle body current Ivl and the charge and discharge current Ipb. The target charge and discharge current Ilibt may be requested for the lithium ion battery 27. The vehicle body current Ivl may be supplied to the vehicle body equipment group 39. Hence, it is possible to stably control the lithium ion battery 27 and the engine 12. In other words, the lithium ion battery 27 may be allowed to be charged or to discharge in accordance with the target charge and discharge current Ilibt. This makes it possible to suppress a rapid change in the charge and discharge current Ilib of the lithium ion battery 27, and to stably control the lithium ion battery 27. Moreover, the suppression of the rapid change in the charge and discharge current Ilib of the lithium ion battery 27 makes it possible to stabilize regeneration torque of the motor generator 16, and to steadily control the engine 12 that is coupled to the motor generator 16. In other words, it is possible to prevent an engine stall accompanying an excessive increase in the regeneration torque.

As described, this implementation of the technology may involve controlling the generated voltage and the generated current of the generator, making it possible to stably control the power storage and the engine. In other words, for example, controlling the generated voltage of the generator without controlling the generated current of the generator may cause instability of the charge and discharge control of the power storage, or instability of the engine control. Because of the low internal resistance of the power storage such as the lithium ion battery, there is possibility that the generated current may increase rapidly and flow into the power storage from the generator, even if, for example, the generated voltage of the generator is limited under a low state of charge. Such a rapid increase in the generated current of the generator may cause not only the instability of the charge and discharge control of the power storage due to a rapid increase in a charge current into the power storage, but also the instability of the engine control due to a rapid increase in power generation torque of the generator that may serve as an engine load. The implementation of the technology may involve controlling the generated current of the generator to keep the generated current of the generator from excessively increasing. Hence, it is possible to stably control the power storage and the engine.

Moreover, as illustrated in FIG. 9, the charge and discharge range of the lithium ion battery 27 may be provided with the regeneration standby zone set between the charging zone and the discharging zone. In the regeneration standby zone, the target charge and discharge current Ilibt of the lithium ion battery 27 may be set to "zero (0)". This allows the motor generator 16 to be controlled to the regeneration standby state, so as to suppress the charge and discharge of the lithium ion battery 27, i.e., to suppress the generated current of the motor generator 16. Thus, the charge and discharge range of the lithium ion battery 27 is not simply divided into the charging zone and the discharging zone, but may be provided with the regeneration standby zone interposed between the charging zone and the discharging zone. This makes it possible to restrain the combustion power generation state of the motor generator 16, leading to enhancement in the fuel consumption performance of the vehicle 11.

In other words, adjacent arrangement of the charging zone and the discharging zone may be a factor that causes transition between the charging zone and the discharging zone. This results in possibility that electric power may be stored in the lithium ion battery 27 by the combustion power generation in the charging zone, but thereafter, the electric power thus stored may be immediately consumed in the discharging zone. In contrast, the regeneration standby zone interposed between the charging zone and the discharging zone makes it possible to suppress the transition between the charging zone and the discharging zone, leading to suppression of the combustion power generation in the charging zone. In this case, as denoted by an outlined arrow in FIG. 9, execution of the regenerative power generation and the battery discharge allows for the transition of the state of charge between the regeneration standby zone and the discharging zone. This leads to the enhancement in the energy efficiency of the vehicle 11 and the fuel consumption performance.

Note that, in the forgoing description, the charge and discharge current Ipb of the lead battery 28 may be used in calculating the target generated current Iisgt of the motor generator 16. However, this is non-limiting. Instead of the charge and discharge current Ipb, a target charge and discharge current Ipbt may be used. The target charge and discharge current Ipbt may be a target value of the charge and discharge current of the lead battery 28. In this case, the target charge and discharge current Ipbt of the lead battery 28 may be set on the basis of a state of charge S2 of the lead battery 28.

[Engine Start Control]

Figure 10:
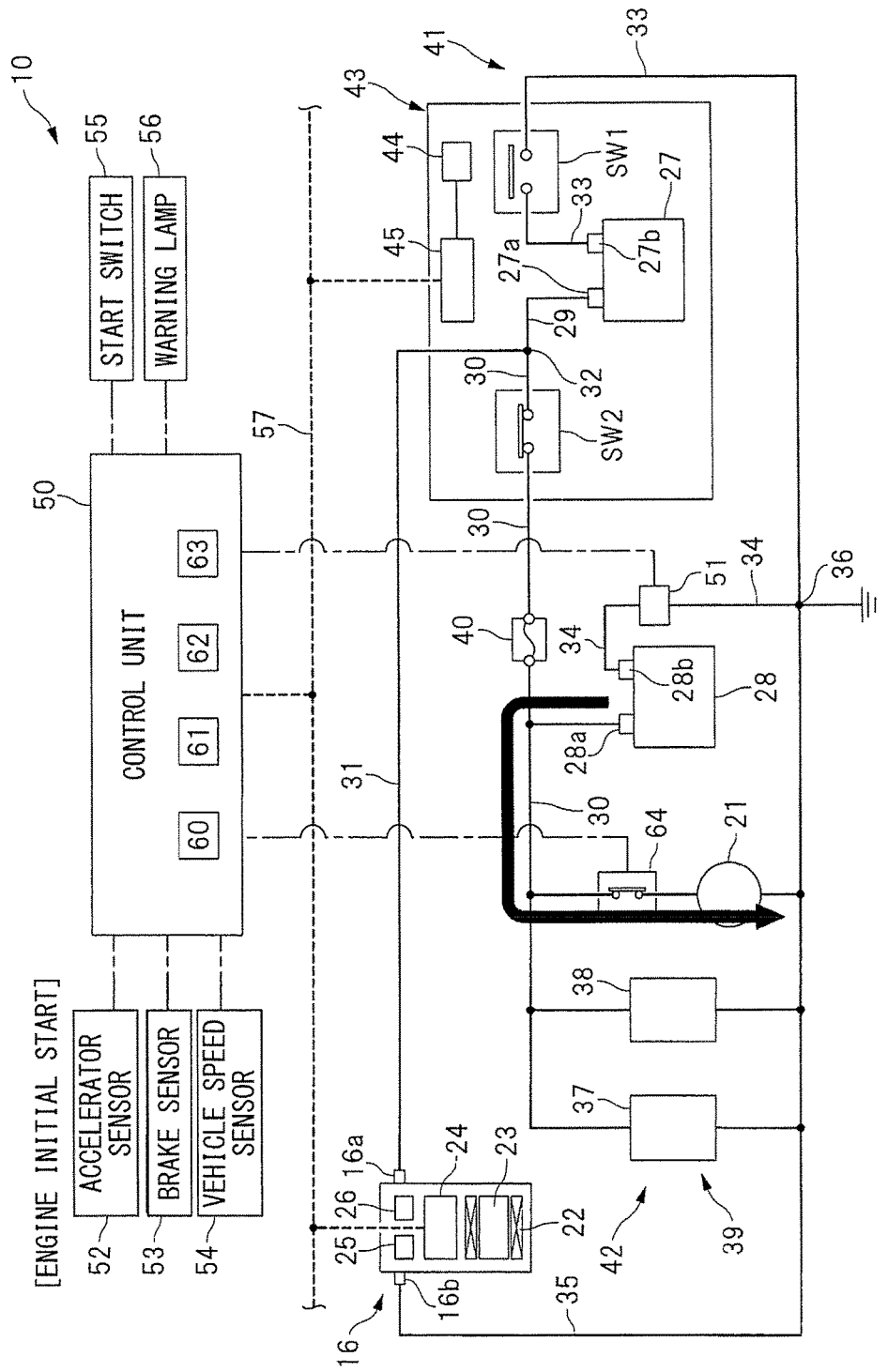
FIG. 10 illustrates a state of power supply of the vehicle power source.
Figure 11:
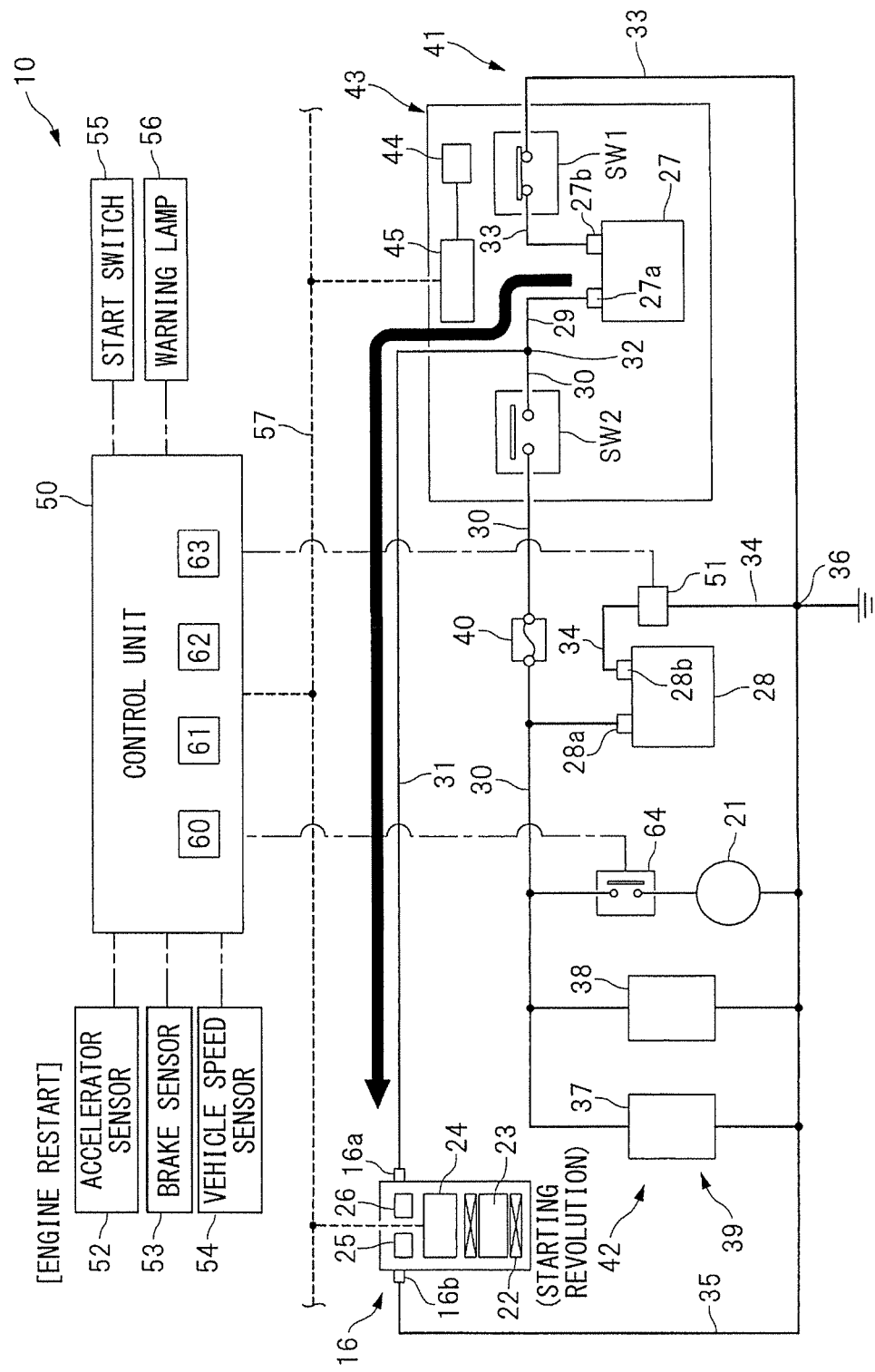
FIG. 11 illustrates a state of power supply of the vehicle power source.

Description is given next of the power supply states of the vehicle power source 10 at engine start. FIGS. 10 and 11 illustrate the power supply states of the vehicle power source 10. FIG. 10 illustrates the power supply state at initial start of the engine by operation of the start switch. FIG. 11 illustrates the power supply state at engine restart by the idling stop control.

Referring to FIG. 10, at the initial start of the engine by the operation of the start switch by a driver, the ON/OFF switch SW2 in the battery module 43 may be closed, and thereafter, a starter relay 64 may be closed. This may cause power supply from the lead battery 28 to the starter motor 21, allowing the engine 12 to be started by cranking operation of the starter motor 21. Note that the ON/OFF switch SW1 in the battery module 43 may be closed after the engine 12 is started. In the forgoing description, the ON/OFF switch SW1 may be opened in view of suppression of discharge of the lithium ion battery 27. However, this is non-limiting. For example, under a low temperature environment such as, but not limited to, a cold district, the ON/OFF switches SW1 and SW2 may be closed to allow the starter motor 21 to be supplied with power from both the lead battery 28 and the lithium ion battery 27.

Referring to FIG. 11, at the engine restart by the idling stop control, the ON/OFF switch SW2 in the battery module 43 may be opened, and thereafter, target drive torque of the motor generator 16 may be raised. This may cause power supply from the lithium ion battery 27 to the motor generator 16, allowing the engine 12 to be started by the cranking operation of the motor generator 16. At the engine restart by the idling stop control, the ON/OFF switch SW2 may be opened to electrically separate the first power circuit 41 from the second power circuit 42. This makes it possible to prevent an instantaneous voltage drop of the second power circuit 42 with respect to the instantaneous voltage drop protection load 37. Hence, it is possible to keep the instantaneous voltage drop protection load 37 in operation during the engine restart, leading to enhanced vehicle quality.

The technology is by no means limited to the implementations described above, and may be modified in variety of ways without departing from the scope of the subject matter of the technology. As described above, the lithium ion battery 27 may be adopted as the "first power storage", and the lead battery 28 may be adopted as the "second power storage". However, the "first power storage" and the "second power storage" are not limited thereto. For example, a lead battery, a nickel hydrogen battery, an electric double layered capacitor, and other batteries or capacitors may be adopted as the "first power storage". A lithium ion battery, a nickel hydrogen battery, an electric double layered capacitor, and other batteries or capacitors may be adopted as the "second power storage". Furthermore, it should be appreciated that a same kind of power storages that are different in terminal voltages or internal resistance may be adopted as the "first power storage" and the "second power storage". Note that, in combined use of the lithium ion battery 27 and the lead battery 28, an iron phosphate lithium ion battery may be adopted for the lithium ion battery 27. The iron phosphate lithium ion battery includes iron phosphate lithium as a positive electrode material. Moreover, the technology may be effectively applicable to a vehicle power source from which the lead battery 28 that may serve as the "second power storage" is eliminated.

The forgoing description involves using the motor generator 16 that may serve as a generator and an electric motor. However, this is non-limiting. A generator that does not serve as an electric motor may be also used. Moreover, the motor generator 16 is not limited to an induction generator, and generators of other forms may also be adopted. Moreover, the ON/OFF switches SW1 and SW2 provided in the vehicle power source 10 may be a semiconductor switch that includes a semiconductor element, or an electromagnetic switch that allows a contact to operate by electromagnetic force.

In the forgoing description, the control unit 50 as one unit may include the current consumption estimating unit 60, the charge and discharge current setting unit 61, the generated current setting unit 62, and the generated current controller 63. However, this is non-limiting. For example, the current consumption estimating unit 60, the charge and discharge current setting unit 61, the generated current setting unit 62, and the generated current controller 63 may be separately provided in a plurality of control units 50. Moreover, in the forgoing description, the vehicle body load 38 may be coupled to the second power circuit 42. However, this is non-limiting. The vehicle body load 38 may be coupled solely to the first power circuit 41, or may be coupled to both the first power circuit 41 and the second power circuit 42.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power source mounted on a vehicle, the vehicle power source comprising:
   a generator coupled to an engine;
   a power storage coupled to the generator;
   a vehicle body equipment group coupled, in parallel with the power storage, to the generator;
   a current consumption estimating unit that estimates current consumption of the vehicle body equipment group, on a basis of a generated current of the generator and a charge and discharge current of the power storage;
   a charge and discharge current setting unit that sets a target charge and discharge current of the power storage, on a basis of a state of charge of the power storage;
   a generated current setting unit that sets a target generated current of the generator, on a basis of the current consumption of the vehicle body equipment group and the target charge and discharge current of the power storage; and
   a generated current controller that controls the generated current of the generator, on a basis of the target generated current of the generator.

2. The vehicle power source according to claim 1, wherein
   the charge and discharge current setting unit sets the target charge and discharge current of the power storage on discharge side, when the state of charge of the power storage is higher than a first threshold, and
   the charge and discharge current setting unit sets the target charge and discharge current of the power storage on charge side, when the state of charge of the power storage is lower than a second threshold that is smaller than the first threshold.

3. The vehicle power source according to claim 2, wherein
   the charge and discharge current setting unit sets the target charge and discharge current of the power storage to the current consumption of the vehicle body equipment group, to set the target charge and discharge current on the discharge side, when the state of charge of the power storage is higher than the first threshold,
   the charge and discharge current setting unit sets the target charge and discharge current of the power storage to a first current value, to set the target charge and discharge current on the charge side, when the state of charge of the power storage is lower than the second threshold that is smaller than the first threshold, and
   the charge and discharge current setting unit sets the target charge and discharge current of the power storage to a second current value, when the state of charge of the power storage is lower than the first threshold and higher than the second threshold, an absolute value of the second current value being smaller than an absolute value of the first current value.

4. The vehicle power source according to claim 3, wherein the second current value is zero.

5. The vehicle power source according to claim 2, wherein the generated current controller suspends power generation of the generator, when the state of charge of the power storage is higher than the first threshold.

6. The vehicle power source according to claim 3, wherein the generated current controller suspends power generation of the generator, when the state of charge of the power storage is higher than the first threshold.

7. The vehicle power source according to claim 4, wherein the generated current controller suspends power generation of the generator, when the state of charge of the power storage is higher than the first threshold.

8. The vehicle power source according to claim 1, wherein
   the power storage comprises a first power storage, and
   the vehicle body equipment group includes a second power storage, a terminal voltage of the second power storage being lower than a terminal voltage of the first power storage.

9. The vehicle power source according to claim 2, wherein
   the power storage comprises a first power storage, and
   the vehicle body equipment group includes a second power storage, a terminal voltage of the second power storage being lower than a terminal voltage of the first power storage.

10. The vehicle power source according to claim 3, wherein
    the power storage comprises a first power storage, and
    the vehicle body equipment group includes a second power storage, a terminal voltage of the second power storage being lower than a terminal voltage of the first power storage.

11. The vehicle power source according to claim 4, wherein
    the power storage comprises a first power storage, and
    the vehicle body equipment group includes a second power storage, a terminal voltage of the second power storage being lower than a terminal voltage of the first power storage.

12. The vehicle power source according to claim 5, wherein
    the power storage comprises a first power storage, and
    the vehicle body equipment group includes a second power storage, a terminal voltage of the second power storage being lower than a terminal voltage of the first power storage.

13. The vehicle power source according to claim 6, wherein
    the power storage comprises a first power storage, and
    the vehicle body equipment group includes a second power storage, a terminal voltage of the second power storage being lower than a terminal voltage of the first power storage.

14. The vehicle power source according to claim 7, wherein the power storage comprises a first power storage, and the vehicle body equipment group includes a second power storage, a terminal voltage of the second power storage being lower than a terminal voltage of the first power storage.

\* \* \* \* \*